US010281277B1

United States Patent
Perahia et al.

(10) Patent No.: US 10,281,277 B1
(45) Date of Patent: May 7, 2019

(54) PHONONIC TRAVELLING WAVE GYROSCOPE

(71) Applicant: HRL Laboratories, LLC, Malibu, CA (US)

(72) Inventors: Raviv Perahia, Agoura Hills, CA (US); Logan D. Sorenson, Thousand Oaks, CA (US); Lian X. Huang, Thousand Oaks, CA (US); Hung Nguyen, Los Angeles, CA (US); David T. Chang, Calabasas, CA (US); Deborah J. Kirby, Calabasas, CA (US)

(73) Assignee: HRL Laboratories, LLC, Malibu, CA (US)

(*) Notice: Subject to any disclaimer, the term of this patent is extended or adjusted under 35 U.S.C. 154(b) by 160 days.

(21) Appl. No.: 15/347,748

(22) Filed: Nov. 9, 2016

Related U.S. Application Data

(60) Provisional application No. 62/279,134, filed on Jan. 15, 2016.

(51) Int. Cl.
*G01C 19/58* (2006.01)
*G01C 19/64* (2006.01)
*G01C 19/5698* (2012.01)
*G10K 11/20* (2006.01)

(52) U.S. Cl.
CPC ......... *G01C 19/5698* (2013.01); *G10K 11/20* (2013.01)

(58) Field of Classification Search
None
See application file for complete search history.

(56) References Cited

U.S. PATENT DOCUMENTS

| 5,097,707 A * | 3/1992 | Church | G01C 19/5698 73/504.01 |
| 2004/0187583 A1* | 9/2004 | Ogawa | G01S 7/52046 73/628 |
| 2009/0133495 A1* | 5/2009 | Arakawa | G01C 19/5698 73/504.01 |

FOREIGN PATENT DOCUMENTS

JP 09210694 A * 8/1997

OTHER PUBLICATIONS

Title: a novel high sensitivity MEMS Acoustic Gyroscope; URL: https://ieeexplore.ieee.org/iel7/7350021/7370096/07370329.pdf (Year: 2015).*
Title: Design URL:https://www.researchgate.net/profile/Jerome_Faist/publication/26297870_Design_and_fabrication_of_photonic_crystal_quantum_cascade_lasers_for_optofluidics/links/0912f50f8f320533c5000000/Design-and-fabrication-of-photonic-crystal-quantum-cascade-lasers-for-optofluidics.pdf (Year: 2007).*
Eichenfield, Matt et al., "Optomechanical Crystals", Letters, Nature, Nov. 5, 2009, pp. 78-82, vol. 462, Macmillan Publishers Limited.
Hatanaka, D. et al., "Phonon waveguides for electromechanical circuits", Letters, Nature Nanotechnology, Jun. 15, 2014, pp. 520-524, vol. 9, Macmillan Publishers Limited.

(Continued)

*Primary Examiner* — Leslie J Evanisko
*Assistant Examiner* — Ruben C Parco, Jr.
(74) *Attorney, Agent, or Firm* — Lewis Roca Rothgerber Christie, LLP

(57) ABSTRACT

A phononic travelling wave gyroscope. The gyroscope includes a phononic waveguide including at least one loop. The phase change incurred by phonons propagating around the loop is compared to a reference phase, and utilized to form an estimate of the rotational rate of the gyroscope.

24 Claims, 15 Drawing Sheets

(56) References Cited

OTHER PUBLICATIONS

Kokkonen, Kimmo et al., "Dispersion and Mirror Transmission Characteristics of Bulk Acoustic Wave Resonators", IEEE Transactions on Ultrasonics, Ferroelectrics, and Frequency Control, Jan. 2011, pp. 215-225, vol. 58, No. 1.
Lakin, K.M. et al., "Solidly Mounted Resonators and Filters", IEEE Ultrasonics Symposium, 1995, pp. 905-908.
Lefèvre, Hervé, "Fiber-Optic Gyroscopes", Table of Contents, Foreword, Preface, Chapter 1: Introduction, Chapter 2: Principle of the Fiber-Optic Gyroscope, Chapter 10: Alternative Approaches for the I-Fog, and Chapter 11: Resonant Fiber-Optic Gyroscope, 1993, 31 pages, ISBN 0-89006-537-3, Artech House, Inc., Norwood, Massachusetts.
Maldovan, Martin, "Sound and heat revolutions in phononics", Review, Nature, Nov. 14, 2013, pp. 209-217, vol. 503, Macmillan Publishers Limited.
Rozelle, David M., "The Hemispherical Resonator Gyro: From Wineglass to the Planets", American Astronautical Society, Spaceflight Mechanics, Advances in the Astronautical Sciences, 2009, 23 pages, vol. 134.
Safavi-Naeini, Amir H. et al., "Two-Dimensional Phononic-Photonic Band Gap Optomechanical Crystal Cavity", American Physical Society, Physical Review Letters, Apr. 18, 2014, pp. 153603-1 through 153603-5.
Tabrizian, R. "Effect of Phonon Interactions on Limiting the f.Q Product of Micromechanical Resonators", IEEE, Transducers, Jun. 21-25, 2009, pp. 2131-2134.

\* cited by examiner

US 10,281,277 B1

PHONONIC TRAVELLING WAVE GYROSCOPE

CROSS-REFERENCE TO RELATED APPLICATION(S)

The present application claims priority to and the benefit of U.S. Provisional Application No. 62/279,134, filed Jan. 15, 2016, entitled "PHONONIC TRAVELLING WAVE GYROSCOPE", the entire content of which is incorporated herein by reference.

FIELD

One or more aspects of embodiments according to the present invention relate to inertial sensors, and more particularly to a gyroscope utilizing phonons propagating in a phononic waveguide.

BACKGROUND

Tactical and navigation grade gyroscopes have numerous applications. They may be used, for example, to mitigate temporary lapses in onboard navigation capability, whether that is due to Global Positioning System (GPS) denial or degradation of other navigation sensors due to environmental or operational effects. In other applications the output of a gyroscope may be merged, in a suitable estimator, with the outputs of other sensors (such as a GPS receiver and a 3-axis accelerometer) to provide high accuracy navigation data. Moreover, in some applications a gyroscope may be exposed to high rotation rates (e.g., 100,000°/s), high acceleration or shock (e.g., 50 g RMS vibration and 50,000 g shock), or extremes of temperature (e.g., −54 to 85° C.). A gyroscope may also operate within tight power constraints (e.g., 250 mW) and volume constraints (e.g., 1 cm$^3$). Some related art designs such as fiber optic gyroscopes or Coriolis vibratory gyroscopes may be too large, or insufficiently robust for such applications.

Thus, there is a need for a robust, high-performance gyroscope.

SUMMARY

Aspects of embodiments of the present disclosure are directed toward a gyroscope in which phonons traveling in a waveguide experience a phase shift. The phase shift is measured or estimated and a rotation rate of the gyroscope is inferred from the phase shift.

According to an embodiment of the present invention there is provided a gyroscope, including: a first phononic waveguide including a first loop; a first phonon generator operatively coupled to the first phononic waveguide; a first phonon detector operatively coupled to the first phononic waveguide; and a circuit configured to estimate a difference between: a phase of phonons, after traveling at least once around at least the first loop in a first direction, and a reference phase.

In one embodiment, the circuit is configured to supply a first drive signal to the first phonon generator, and the reference phase is a phase of the first drive signal.

In one embodiment, the gyroscope includes: a second phononic waveguide including a second loop; a second phonon generator operatively coupled to the second phononic waveguide; and wherein the reference phase is a phase of phonons after traveling at least once around at least the second loop in a second direction opposite the first direction.

In one embodiment, the gyroscope includes: a phononic waveguide coupler having: a first input connected to an output end of the first phononic waveguide; a second input connected to an output end of the second phononic waveguide; and a first output connected to the first phonon detector, wherein the circuit is configured to estimate a phase difference between phonons received by the first input of the coupler, and phonons received by the second input of the coupler from a photon power received by the first phonon detector.

In one embodiment, the gyroscope includes: a second phonon detector operatively coupled to the second phononic waveguide, wherein: the phononic waveguide coupler further has a second output connected to the second phonon detector, and the circuit is configured to estimate a phase difference between phonons received by the first input of the coupler, and phonons received by the second input of the coupler from: a photon power received by the first phonon detector and/or a photon power received by the second phonon detector.

In one embodiment, the circuit is configured to drive the first phonon generator with a first drive signal and to drive the second phonon generator with the first drive signal.

In one embodiment, the first loop is a closed loop.

In one embodiment, the gyroscope includes: a second phononic waveguide; a second phonon generator; a second phonon detector; a first phononic waveguide coupler connected to the second phononic waveguide, the first phonon generator, and the first phonon detector; a second phononic waveguide coupler connected to the second phononic waveguide, the second phonon generator, and the second phonon detector; and a third phononic waveguide coupler configured to couple phonons between the first loop and the second phononic waveguide.

In one embodiment, the first phononic waveguide coupler has: a common port connected to a first end of the second phononic waveguide; an input port connected to the first phonon generator and coupled to the common port; and an output port connected to the first phonon detector, the output port being coupled to the common port and isolated from the input port, and the second phononic waveguide coupler has: a common port connected to a first end of the second phononic waveguide; an input port connected to the second phonon generator and coupled to the common port; and an output port connected to the second phonon detector, the output port being coupled to the common port and isolated from the input port.

In one embodiment, the circuit is configured: to drive the first phonon generator with a first drive signal and to drive the second phonon generator with the first drive signal; and to estimate a difference between a phase of phonons detected by the first phonon detector and a phase of phonons detected by the second phonon detector In one embodiment, the gyroscope includes: a second phonon generator; a second phonon detector; a first phononic waveguide coupler having: a common port connected to a first end of the first phononic waveguide; an input port connected to the first phonon generator and coupled to the common port; and an output port connected to the first phonon detector, the output port being coupled to the common port and isolated from the input port; and a second phononic waveguide coupler having: a common port connected to a second end of the first phononic waveguide; an input port connected to the second phonon generator and coupled to the common port; and an output port connected to the second phonon detector, the output port being coupled to the common port and isolated from the input port, wherein the circuit is configured: to drive the first phonon generator with a first drive signal and to drive the second phonon generator with the first drive signal; and to estimate a difference between: a phase of phonons detected by the first phonon detector, and a phase of phonons detected by the second phonon detector.

In one embodiment, the first phonon generator includes a first electrode and a second electrode, the first electrode and the second electrode being configured to experience a mutually attractive force in response to a voltage applied across them, and the first electrode and the second electrode being both mechanically coupled to the first phononic waveguide and configured to transmit phonons into the first phononic waveguide when an oscillating voltage is applied across them.

In one embodiment, the first electrode has a first portion and the second electrode has a second portion, the first portion and the second portion being interdigitated.

In one embodiment, the first phonon detector includes a first electrode and a second electrode, the first electrode and the second electrode being mechanically coupled to the first phononic waveguide and configured to form a capacitor having a capacitance that fluctuates when phonons propagate into the first phonon detector.

In one embodiment, the first electrode has a first portion and the second electrode has a second portion, the first portion and the second portion being interdigitated.

In one embodiment, the first phonon detector includes an opto-mechanical cavity configured to act as a phonon resonator and as a photon resonator, the opto-mechanical cavity being operatively coupled to the first phononic waveguide and to a photonic waveguide.

In one embodiment, the opto-mechanical cavity is surrounded by a periodic structure forming a phononic bandgap, the periodic structure being configured to confine phonons in the opto-mechanical cavity.

In one embodiment, the first phonon generator includes a piezoelectric element configured to transmit phonons into the first phononic waveguide.

In one embodiment, the first phonon detector includes a piezoelectric element configured to receive phonons from the first phononic waveguide.

In one embodiment, the first phonon generator includes a thermal actuator configured to expand when heated by an electric current or by light, and configured to transmit phonons into the first phononic waveguide.

In one embodiment, the first phonon detector includes a thermal element configured to receive and absorb phonons from the first phononic waveguide and to exhibit a change in temperature in response to an absorption of phonons.

In one embodiment, the first phononic waveguide is a curved suspended structure, having a rectangular cross section with dimensions of less than 10 microns by 10 microns.

In one embodiment, the first phononic waveguide is a phononic crystal waveguide.

In one embodiment, the gyroscope includes: a substrate; an anchor layer including a plurality of anchors; and an acoustic layer supported by the anchors, the acoustic layer having a first plurality of holes arranged in a periodic structure forming a phononic bandgap, the first phononic waveguide being defined on the acoustic layer by a path lacking holes or having holes differing, in size or in spacing, from the holes of the first plurality of holes.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a phononic travelling wave gyroscope, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In some embodiments a gyroscope is constructed from one or two spiral, circular, or approximately circular (e.g., substantially circular, or polygonal) phononic waveguides, and the phase delay phonons accumulate in traveling around the phononic waveguide is related to the rotation rate of the waveguide. A phonon generator is used to produce phonons that travel on the waveguide, and a phonon detector is used to detect the phonons that have traveled the length of the waveguide. Additional components, e.g., circuits, are used to measure the phase of the detected phonons and to infer the rotation rate. The device may be fabricated as a microelectromechanical systems (MEMS) device.

In some embodiments, a phononic traveling wave gyroscope interferometrically detects a phase delay due to rotation between two counter-propagating beams. Rotation sensitivity is proportional to the square of phonon velocity (v) and inversely proportional to frequency (f), length (L), and loop diameter (D), according to the equation:

$$\Omega = v^2/(2f L D) \quad (1)$$

In Equation (1), $\Omega$ is the rotation rate, in radians per second, for which the phonon phase at the output of the waveguide (for constant phase at the input) changes by 180 degrees. In some embodiments bias stability of 0.01°/hour with a device having a volume of about 1 cm$^3$ may be achieved in part because of the high interaction of phonons with inertial signals due to their relatively low speed (e.g., a factor of 10$^4$ slower than the speed of light). For example, rotation accuracy of 0.01°/hour may be achieved with a phononic traveling wave gyroscope having one or two waveguides, each having a length of less than one meter, and one meter of length may be coiled into a chip having a volume of less than 1 cm$^3$. The mass of such a small chip may be small (~100 μgram) and accordingly its susceptibility to shock may be relatively low.

Figure 1A:
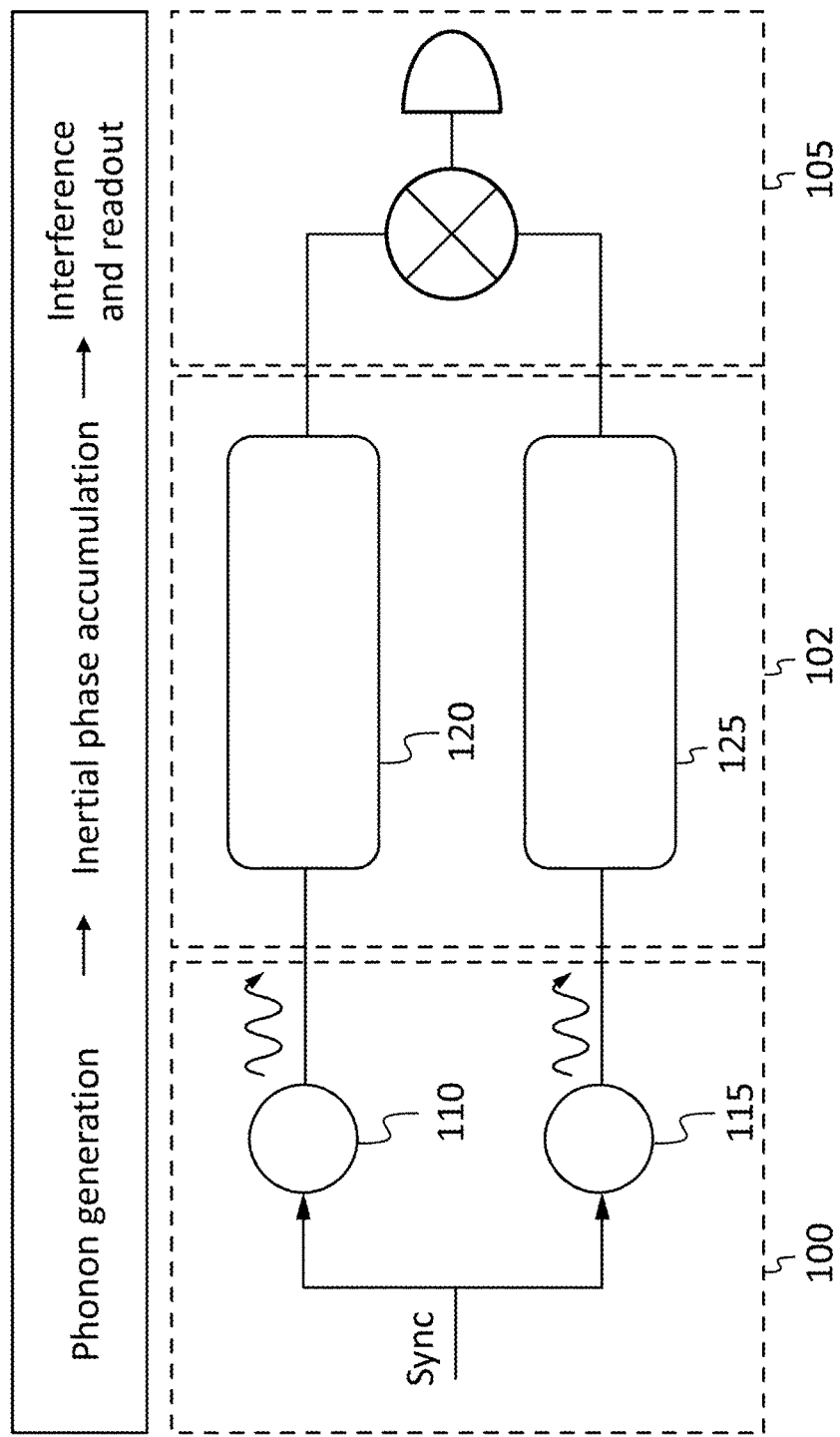
FIG. 1A is a block diagram of a phononic traveling wave gyroscope, according to an embodiment of the present invention.

Referring to FIG. 1A, in one embodiment, the phononic traveling wave gyroscope includes three sections: a phonon generation section 100, an inertial phase accumulation section 102, and an interference and readout section 105. In one embodiment, each of a first phonon generator 110 and a second phonon generator 115 produces a plurality of phonons that are transmitted into respective phononic waveguides 120, 125. The phonon generators 110, 115 are synchronized so that the phonons are synchronized (i.e., the input phonon phases in the phononic waveguides 120, 125 are the same) or so that the relative phase of the phonons that are respectively transmitted into the phononic waveguides 120, 125 is known.

In the phonon generation section 100, phonon waves are generated by one or more phonon generators. Phonons are generated via electrostatic, optical-mechanical, piezo-electric, or thermal transduction. The mechanical frequency of the phonons may vary from 1 MHz to several hundred GHz depending on the design and material properties of the inertial phase accumulation section 102. In some embodiments, a single phonon generator may be used with a suitable phononic waveguide splitter, or "divider", instead of the two synchronized phonon generators 110, 115 illustrated in FIG. 1A.

As used herein, a "phonon" is a quantum of elastic wave energy, and, as such, the operation of a phononic traveling wave gyroscope may equivalently be understood or explained in terms of elastic waves produced by elastic wave generators, caused to propagate in elastic wave waveguides, and interfered and detected by elastic wave couplers and elastic wave detectors.

The inertial phase accumulation section 102, may include at least one phononic waveguide fabricated from a solid material, including without limitation for example, silicon, fused silica, quartz, diamond, silicon carbide, aluminum nitride, and gallium nitride. Each phononic waveguide may have an open (e.g., spiral) or closed shape with, for example, either circular or n-sided polygon topology, as discussed in further detail below, and illustrated in FIGS. 1B-1E. The phononic waveguide may be designed to support surface acoustic or bulk acoustic modes that travel in either clockwise, counter-clockwise, or both directions. When the phononic traveling wave gyroscope is rotated in the plane of the phonon path (e.g., rotated about an axis perpendicular to this plane) the phonons may accumulate or lose phase, depending on the direction of rotation, as they travel along the circular or approximately circular (e.g., substantially circular, or polygonal) path.

In the interference and readout section 105, the phase change (e.g., phase accumulation or phase loss) in the inertial phase accumulation section 102 is detected by (i) interfering phonons from two phononic waveguides, (ii) interfering phonons from one phononic waveguide and a reference phonon generator, (iii) interfering the detected phonon signals after transduction (to electrical signals or light), or (iv) interfering phonons from counter propagating modes in the same waveguide. The phonons may be detected via electrostatic, optical-mechanical, piezo-electric, or thermal transduction. The rate of rotation of the phononic traveling wave gyroscope may then be inferred from the measured phase delays. High rotation sensitivity may be achieved within a single interference fringe; high dynamic range may be achieved by counting fringes.

Figure 1D:
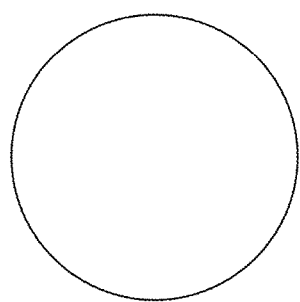
FIG. 1D is a schematic diagram of a phononic waveguide, according to an embodiment of the present invention.
Figure 1E:
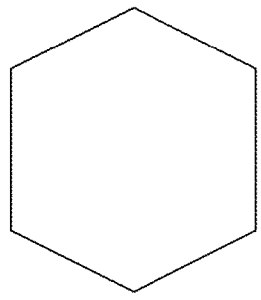
FIG. 1E is a schematic diagram of a phononic waveguide, according to an embodiment of the present invention.
Figure 1B:
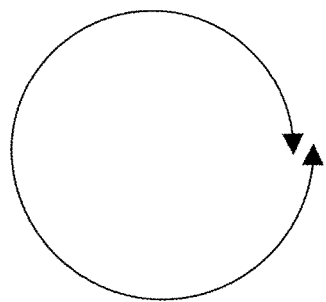
FIG. 1B is a schematic diagram of a phononic waveguide, according to an embodiment of the present invention.
Figure 1C:
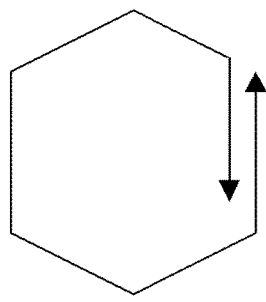
FIG. 1C is a schematic diagram of a phononic waveguide, according to an embodiment of the present invention.

Referring to FIGS. 1B-1E, each of the phononic waveguides may have a circular or approximately circular shape. For example, Referring to FIG. 1B, each of the phononic waveguides 120, 125 may be a spiral with a plurality of turns (of which only one is shown in FIG. 1B), or, referring to FIG. 1C, a polygonal spiral (e.g., an approximately hexagonal polygonal spiral, or a spiral approximating any other regular or irregular polygon). In other embodiments a phononic waveguide may have the shape of an approximately elliptical spiral. A gyroscope having an approximately circular phononic waveguide with two ends, and with a phonon generator at one end configured to transmit phonons into the phononic waveguide, and a phonon detector at the other end configured to detect phonons received from the phononic waveguide, is referred to herein as an interference-mode phononic traveling wave gyroscope. In some embodiments the phononic waveguide is closed, as illustrated in FIGS. 1D-1E. In these embodiments phonons may be coupled into and out of the phononic waveguide by a suitable phononic waveguide coupler, as discussed in further detail below, and illustrated, for example, in FIG. 3B. A gyroscope configured to use a closed phononic waveguide is referred to herein as a resonant-mode phononic traveling wave gyroscope. As in the case of an interference-mode phononic traveling wave gyroscope, the phononic waveguide or phononic waveguides of a resonant-mode phononic traveling wave gyroscope may be circular or approximately circular, e.g., elliptical, or polygonal, and they may be convex outward along their entire length.

Figures 2A, 2B:
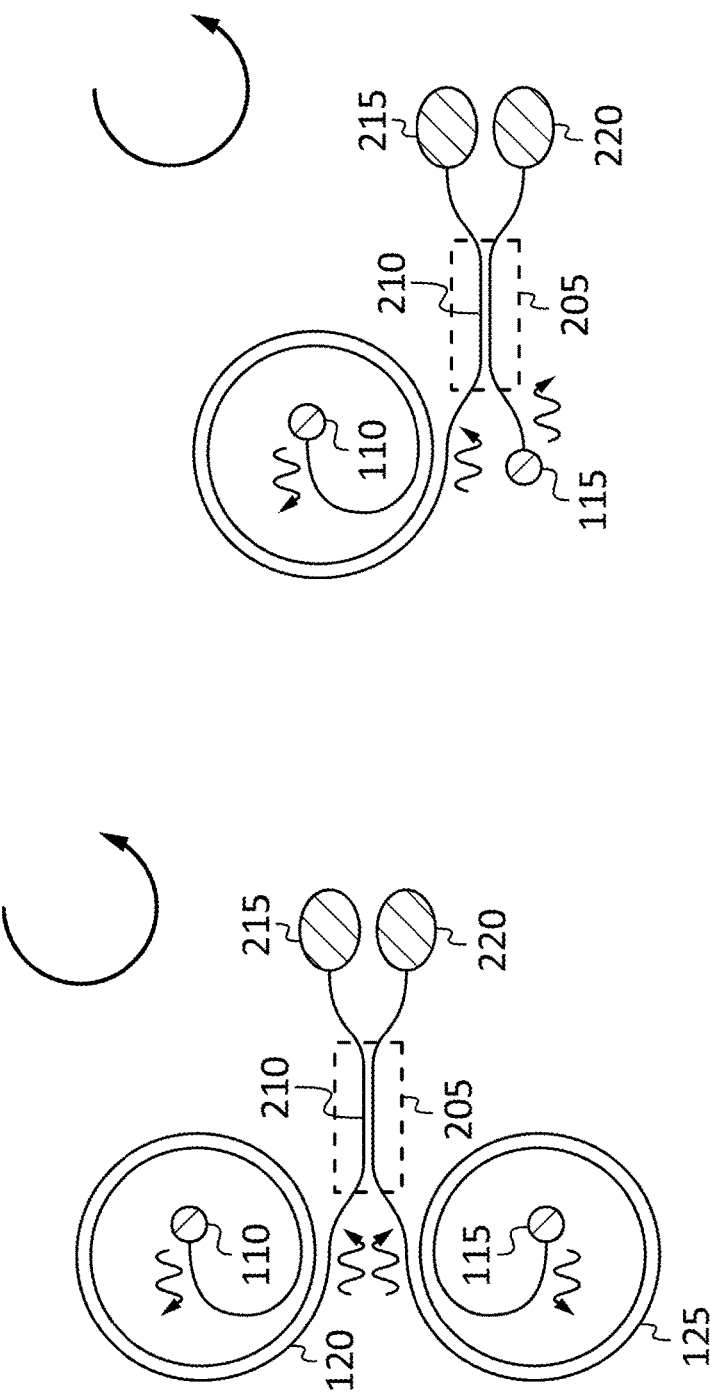
FIG. 2A is a schematic diagram of a phononic traveling wave gyroscope, according to an embodiment of the present invention.
FIG. 2B is a schematic diagram of a phononic traveling wave gyroscope, according to an embodiment of the present invention.

Referring to FIG. 2A, in one embodiment, each of two phonon generators 110, 115 is coupled to a respective spiral phononic waveguide 120, 125. The top and bottom spirals allow phonons to travel in opposite directions, e.g., in counterclockwise and clockwise directions, respectively. The two phononic waveguides come together in the interference region 205, which may include a phononic waveguide coupler 210. The phononic waveguide coupler 210 may include two phononic waveguides that are sufficiently close together, in a region of the phononic waveguide coupler 210, that the evanescent fields of their respective phonon modes overlap and that a significant fraction, e.g., at least 10%, of the phonon power transmitted into one phononic waveguide in the phononic waveguide coupler 210 couples into the other phononic waveguide. The interfered signals are then detected by phonon detectors 215, 220. Either of the two detectors may be unnecessary and may provide redundancy. The detected phase difference may be proportional to the rate of rotation of the phononic traveling wave gyroscope (the beat frequency at the phonon detectors may be proportional to the rate of angular acceleration). As used herein, a phononic waveguide "loop" is a portion of a phononic waveguide that either (i) is closed (as illustrated for example in FIGS. 1D and 1E) or (ii) has two ends that are near or close together (as illustrated for example in FIGS. 1B and 1C) compared to the length of the loop (e.g., the separation between the ends is less than 5% of the length of the loop). A spiral phononic waveguide, e.g., either of the two phononic waveguides illustrated in FIG. 2A, may be composed of a cascade of a plurality of such loops.

In operation, if for example (i) the spiral phononic waveguides 120, 125 have the same length, (ii) the phonon generators 110, 115 are configured to produce phonons with the same phase, and (iii) the phononic waveguide coupler 210 is a 90-degree coupler, then when the phononic traveling wave gyroscope is not rotating, the phononic power received by the two phonon detectors 215, 220 may be equal. If the rotation rate is increased to $v^2/(4\,f\,L\,D)$ (with each symbol having the meaning it has in Equation (1)), then one of the two phonon detectors 215, 220 (e.g., the first phonon detector 215) may receive none of the phonons exiting the phononic waveguides 120, 125 (these phonons interfering destructively at, e.g., the first phonon detector 215) and the other may receive all of the phonon power exiting the phononic waveguide coupler 210. If the rotation rate is increased to $v^2/(2\,f\,L\,D)$, the phononic power received by the two phonon detectors 215, 220 may again be equal, and if the rotation rate is increased to $3\,v^2/(4\,f\,L\,D)$, destructive interference may occur at the other of the two phonon detectors 215, 220 (e.g., at the second phonon detector 215). This sequence, or "fringe pattern", may repeat as the rotation rate is further increased, repeating fully for each increase of $v^2/(f\,L\,D)$. By counting repetitions of this pattern, i.e., by "counting fringes" a readout system (composed, e.g., of input-output circuits and a processing unit) may infer the rotation rate, counting the number of times the pattern has been repeated, estimating any further fractional progress through the pattern, and multiplying by $v^2/(f\,L\,D)$.

Referring to FIG. 2B, in an embodiment, a phononic traveling wave gyroscope has only one spiral phononic waveguide, as shown. In this embodiment phonons from the second phonon generator 115 are not phase shifted in accordance with the rotation rate of the phononic traveling wave gyroscope but instead act as a phase reference for the phonons from the first phonon generator 110, which are phase shifted by an amount proportional to the rotation rate in accordance with Equation (1). The phase shifted phonons and the reference phonons are interfered in the phononic waveguide coupler 210 and detected by two phonon detectors 215, 220, as in the embodiment of FIG. 2A.

In a phononic traveling wave gyroscope with two spiral phononic waveguides 120, 125 (as illustrated in FIG. 2A), the rotation measurement may be a differential measurement, and parasitic sources of error due to vibration, stress, and temperature may cancel to the extent that they occur equally in each spiral. Small differences between spirals may be calibrated out prior to use.

Figure 3B:
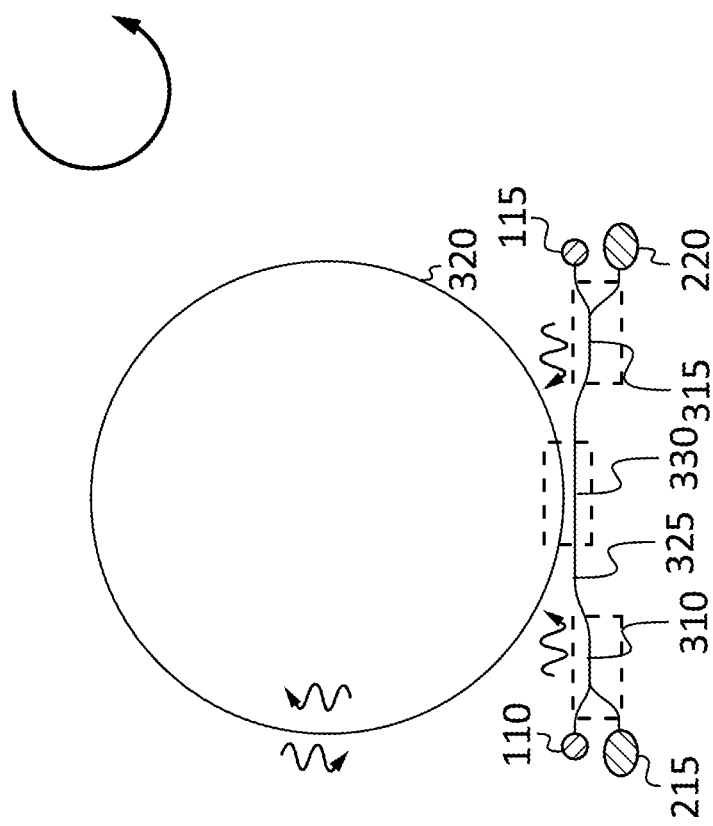
FIG. 3B is a schematic diagram of a phononic traveling wave gyroscope, according to an embodiment of the present invention.
Figure 3A:
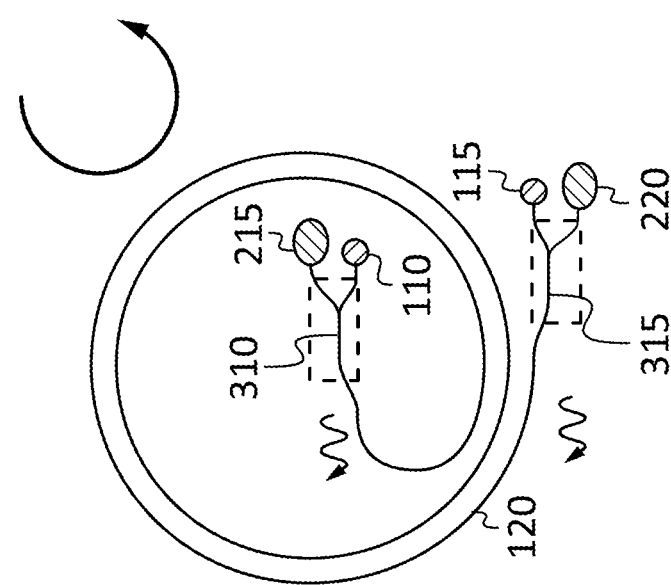
FIG. 3A is a schematic diagram of a phononic traveling wave gyroscope, according to an embodiment of the present invention.

Referring to FIG. 3A, in an embodiment, a phononic traveling wave gyroscope includes a single spiral phononic waveguide in which phonons travel in opposite directions. A first phononic waveguide coupler 310 couples transmitted phonons from the first phonon generator 110 into the phononic waveguide 120 and couples received phonons from the phononic waveguide 120 into a first phonon detector 215. The input and output ports of the first phononic waveguide coupler 310 (which are connected to the first phonon generator 110 and to the first phonon detector 215 respectively) may be isolated from each other. A second phononic waveguide coupler 315 couples transmitted phonons from the second phonon generator 115 into the phononic waveguide 120 and couples received phonons from the phononic waveguide 120 into a second phonon detector 220. Like the input and output ports of the first phononic waveguide coupler 310, the input and output ports of the second phononic waveguide coupler 315 may be isolated from each other. In this embodiment, the signals from the phonon detectors are interfered after they are transduced to a pair of electrical signals or a pair of photonic signals. The interfering may be accomplished for electrical signals, for example by forming an in phase component and a quadrature component from each of the electrical signals (e.g., by mixing it, in an in phase quadrature phase mixer or "IQ mixer" with the drive signal fed to the phonon generators 110, 115), taking the inverse tangent of each ratio of (i) the quadrature component and (ii) the in phase component to obtain a respective phase estimate, and subtracting the phase estimates.

Referring to FIG. 3B, in one embodiment in a resonant-mode phononic traveling wave gyroscope, phonons may travel in both directions in circular paths repeatedly around the closed phononic waveguide 320. A first phononic waveguide coupler 310 couples transmitted phonons from the first phonon generator 110 into the short phononic waveguide 325 and couples received phonons from the short phononic waveguide 325 into a first phonon detector 215. The input and output ports of the first phononic waveguide coupler 310 (which are connected to the first phonon generator 110 and to the first phonon detector 215 respectively) may be isolated from each other. A second phononic waveguide coupler 315 couples transmitted phonons from the second phonon generator 115 into the short phononic waveguide 325 and couples received phonons from the short phononic waveguide 325 into a second phonon detector 220. Like the input and output ports of the first phononic waveguide coupler 310, the input and output ports of the second phononic waveguide coupler 315 may be isolated from each other. Phonons traveling in both directions are coupled between the short phononic waveguide 325 and the closed phononic waveguide 320 by a third phononic waveguide coupler 330.

In the embodiments of both FIG. 3A and FIG. 3B, clockwise and counterclockwise propagating phonons travel along an identical path, and since the measurement is interferometric, the rotation rate measurement may be unaffected by path length changes due to environmental effects.

In these embodiments, however, because phonons may reflect from the coupling regions, there may be parasitic phonon leakage from clockwise to counterclockwise paths and vice versa, which may result in measurement errors.

Figure 4:
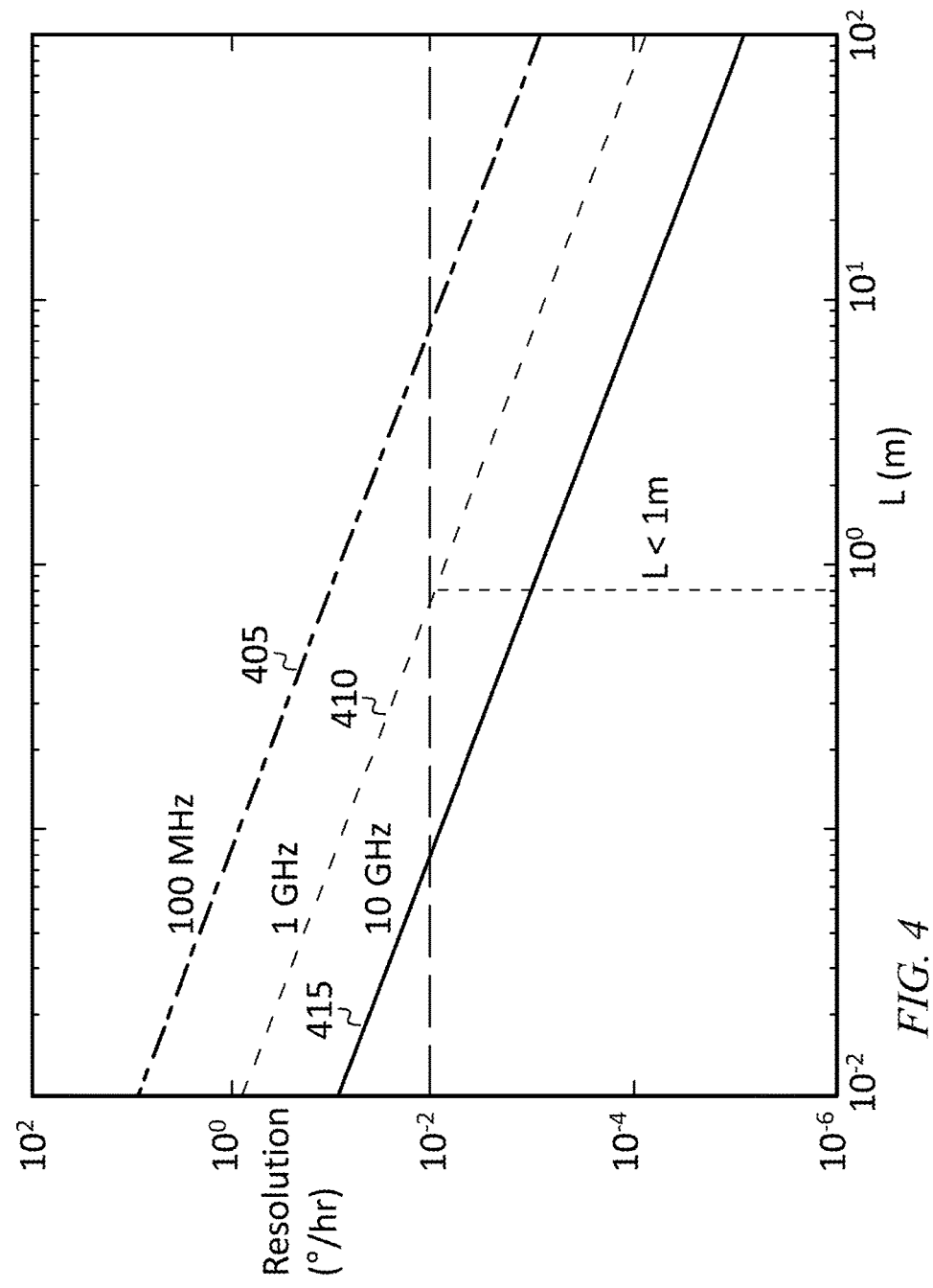
FIG. 4 is a graph of resolution as a function of phononic waveguide length, according to an embodiment of the present invention.

The minimum resolvable rotation of a phononic traveling wave gyroscope may be estimated as a function of phononic waveguide length using the formula of Equation (1). A diameter (D) of 1 cm, and 0.1 ppm phase sensitivity, may be used for the estimate. Rotation rate resolution for three phonon frequencies (f=100 MHz, 1 GHz, and 10 GHz) is shown as a function of phononic waveguide length L by three respective lines 405, 410, 415 in FIG. 4. It can be seen from FIG. 4 that approximately 800 cm of path length will be sufficient for 0.01°/hour bias.

Figure 5:
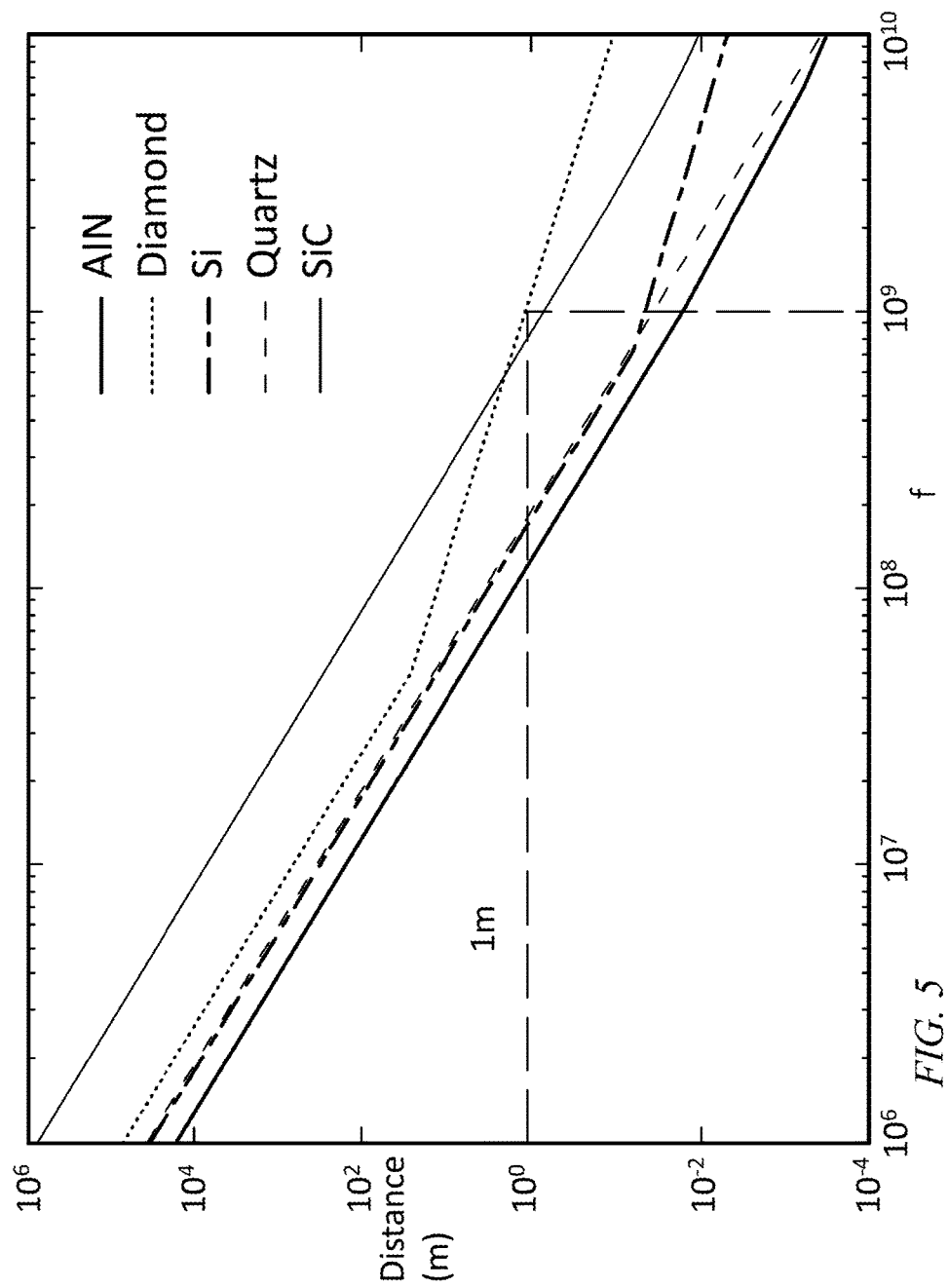
FIG. 5 is a graph of (1/e) propagation lengths as a function of frequency, according to an embodiment of the present invention.

FIG. 5 shows the propagation constant of several acoustic materials. A meter of propagation may be achievable in both diamond and SiC phononic waveguides. A spiral SiC phononic waveguide of 25 loops with 1 cm diameter may achieve 0.01°/hour gyroscope sensitivity. Navigation grade sensitivity may be achieved by sensing a fraction of a single interference fringe, and full scale range of 100,000°/second may be achieved by counting fringes, e.g., counting up to about 3500 fringes.

A phononic waveguide for a phononic traveling wave gyroscope may be fabricated in various forms by any of several methods. For example, a suspended phononic waveguide may be utilized. A phononic waveguide (e.g., a spiral phononic waveguide having a rectangular or square cross section), suspended by thin posts or filaments sufficiently small not to interfere with phonon propagation in the phononic waveguide, may support phononic wave propagation as the boundaries between the material of the phononic waveguide and the surrounding air confine the phonons. In one embodiment, such a phononic waveguide has a diameter of 500 microns, and a cross section with a thickness of 2 microns and a width of 2 microns.

Figure 6A:
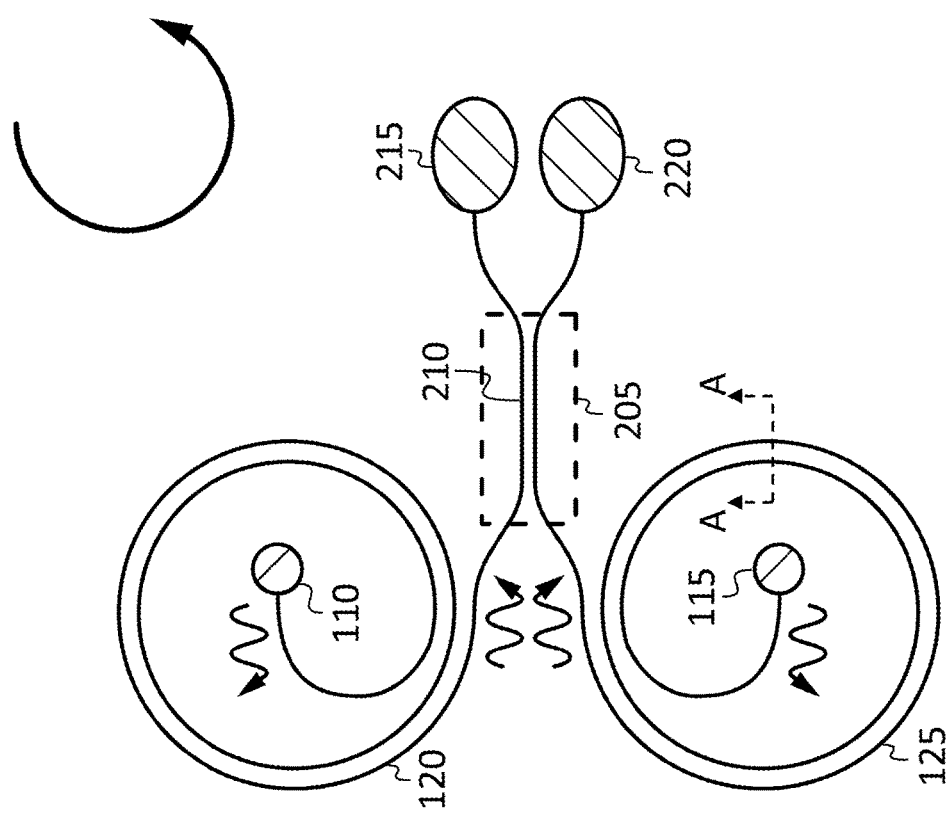
FIG. 6A is a schematic top view of a phononic traveling wave gyroscope, according to an embodiment of the present invention.
Figure 6B:
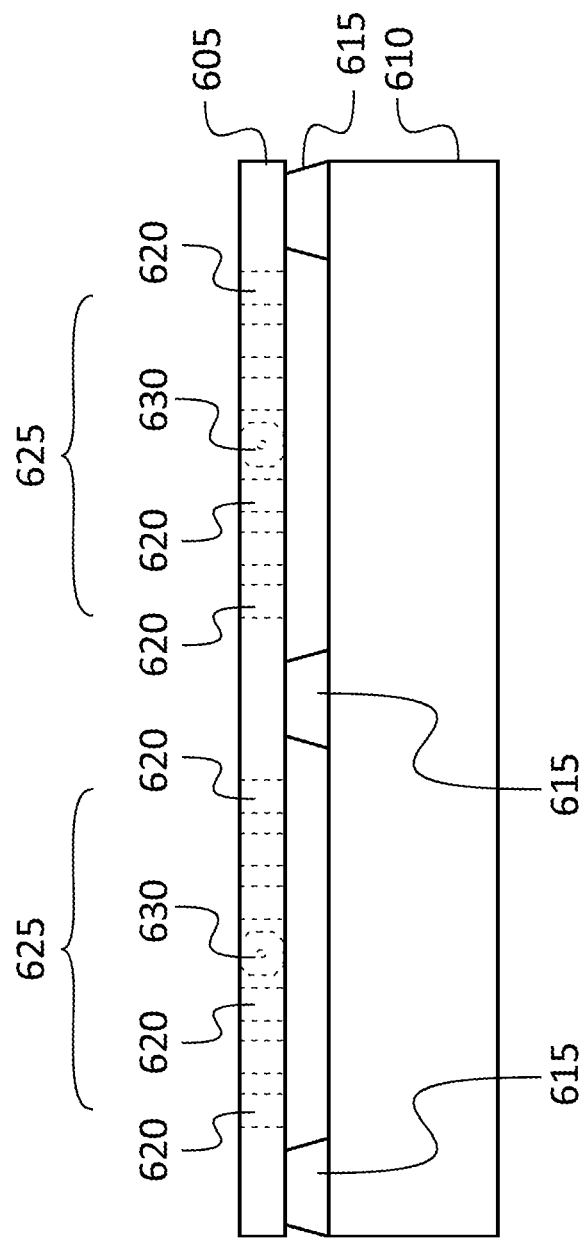
FIG. 6B is a cross section, taken along section line A-A, of the embodiment of FIG. 6A.

Referring to FIGS. 6A and 6B, in some embodiments, a phononic waveguide for a phononic traveling wave gyroscope is a phononic crystal waveguide. FIG. 6A is a plan view of a phononic traveling wave gyroscope, e.g., according to the embodiment of FIG. 2A. FIG. 6B shows a cross section of two turns of the second phononic waveguide 125, along the section A-A of FIG. 6A. In such an embodiment, an acoustic layer 605 is secured to a substrate 610 by a plurality of anchors 615, and phononic crystal waveguides are formed by etching a periodic pattern of holes 620 in the acoustic layer. The periodic structure forms a phononic bandgap and excludes phonon propagation over a range of frequencies in some areas, thus forming a phononic crystal waveguide 625 that supports phononic modes 630. In a suspended membrane phononic crystal architecture, the air above and below confines phonons in the vertical dimension. Such a structure may be inherently robust (e.g., able to withstand significant shock and vibration).

In other embodiments employing a bulk acoustic wave architecture, the phonons are confined by acoustic reflecting layers (above and/or below the phononic waveguide). In such an embodiment, the acoustic layer 605, instead of being supported at a few points by anchors 615, may be supported over its entire lower surface by the top layer of a layered structure that forms a phononic crystal (or Bragg reflector) confining phonons in the vertical direction, e.g., preventing or reducing the loss of phonon power that otherwise might occur by transmission from the phononic waveguide to the substrate.

Figure 7:
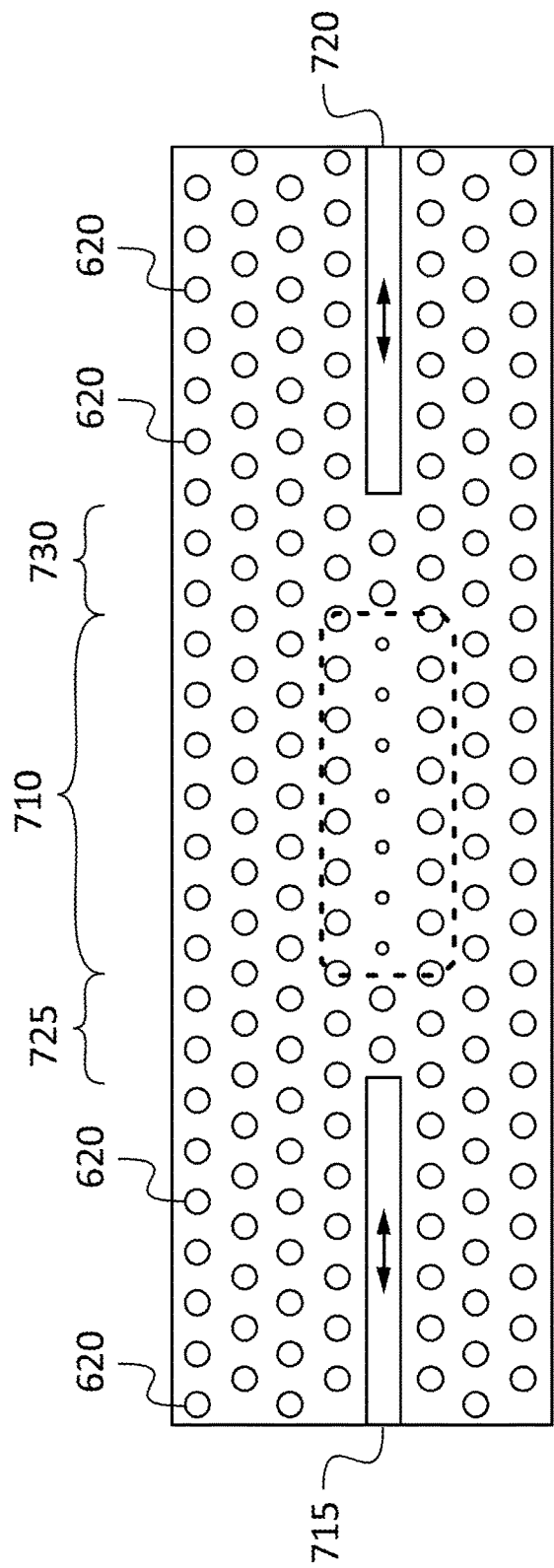
FIG. 7 is a schematic top view of a transducer utilizing an opto-mechanical cavity, according to an embodiment of the present invention.

One or more of several phonon transduction (i.e. generation or detection) techniques may be employed in the phonon generators and phonon detectors. Referring to FIG. 7, in one embodiment, an ultra-sensitive technique is employed using an opto-mechanical cavity (or "phononic-photonic cavity") 710, that supports both photonic and phononic resonant modes, allowing them to interact. A phononic-photonic crystal is an example of such an opto-mechanical cavity and is shown in FIG. 7. A plurality of holes or other regular features forms a phononic crystal, in an acoustic layer, supported, for example, on anchors. The cavity may be defined by a region in which the features (e.g., holes 620) that form the phononic crystal differ from (e.g., are smaller than) those in the surrounding area. On one side of the opto-mechanical cavity there is a phononic waveguide 715, and on the other side there is a photonic waveguide 720. A phonon coupling region 725 and a photon coupling region 730 may each act as a partial reflector of phonons and photons, forming the ends of the opto-mechanical cavity and allowing both photons and phonons to resonate in the opto-mechanical cavity. In one embodiment, the photonic waveguide supplies a stream of photons to the opto-mechanical cavity.

The opto-mechanical cavity may be a Fabry-Perot resonator, for example, with a feature (e.g., a periodic pattern) at each end of the opto-mechanical cavity acting as a reflector, so that photons reflect back and forth in the opto-mechanical cavity. The length of the opto-mechanical cavity may be changed by phonons also resonating in the opto-mechanical cavity. Such changes in length may result in a change in the resonant optical wavelength of the opto-mechanical cavity, which may be detected as a change in the phase (or, for photons having a wavelength that is offset from the resonant wavelength of the opto-mechanical cavity, the number) of photons returning from the opto-mechanical cavity. The phase of the returning photons may be measured, for example, by interfering them with photons from the photon source. The opto-mechanical cavity may thus act as a phonon to photon transducer, that may be part of a phonon detector. In other embodiments the opto-mechanical cavity may act as a phonon generator; for example, photons in the opto-mechanical cavity may cause mechanical changes in the opto-mechanical cavity, e.g., by heating the material of the opto-mechanical cavity or through the effect of radiation pressure; in such an embodiment the opto-mechanical cavity may act as a photon to phonon transducer.

Figure 8:
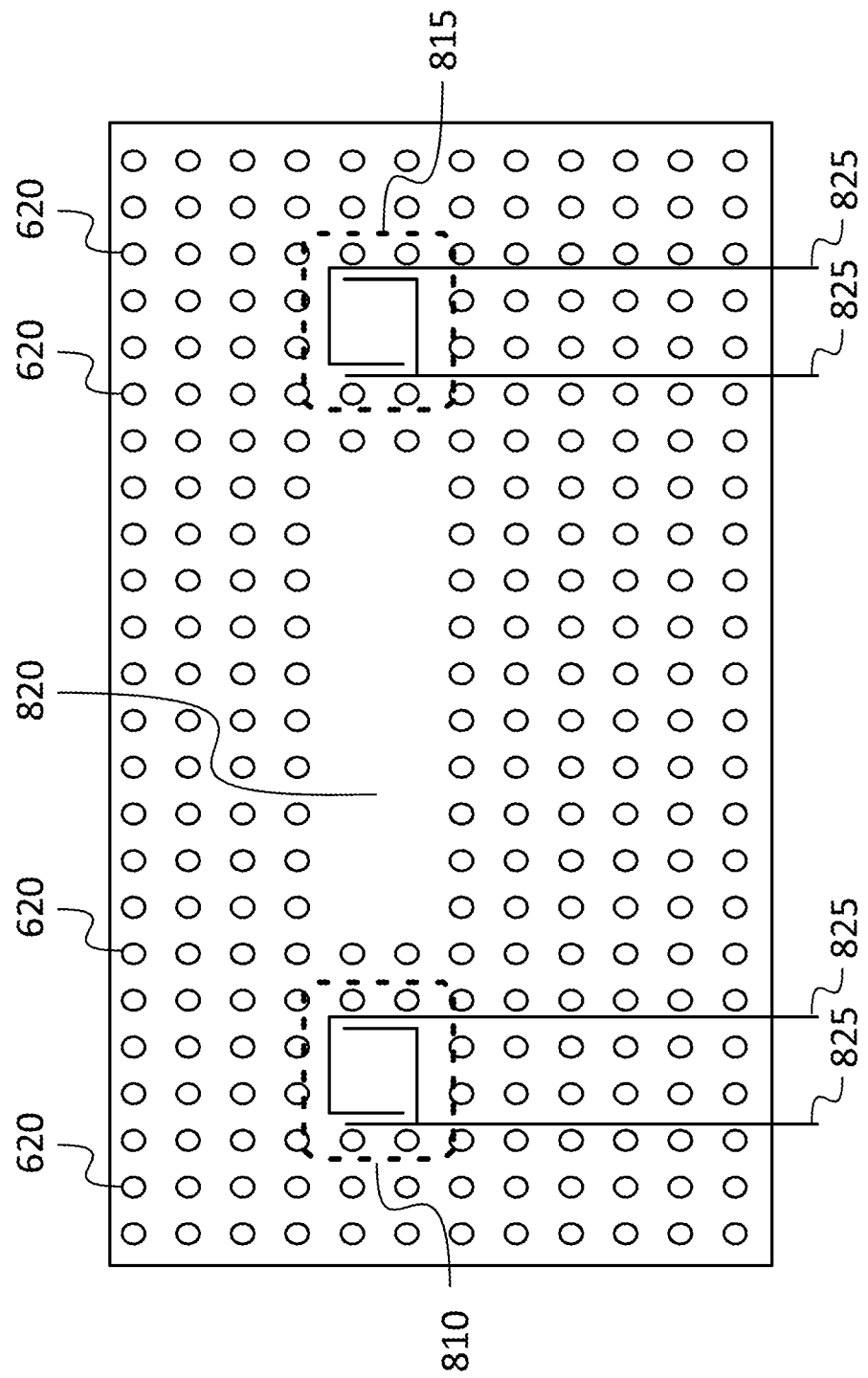
FIG. 8 is a schematic top view of a phononic waveguide with an electrostatic phonon generator and an electrostatic phonon detector, according to an embodiment of the present invention.

In some embodiments, referring to FIG. 8, phonon transducers are based on electrostatic sensors or actuators. FIG. 8 shows a phonon generator 810 and a phonon detector 815 that for simplicity are sketched on either side of a short, straight phononic crystal waveguide 820; in other embodiments they may be used, for example, at the transmitting and receiving ends of one or both of the spiral phononic waveguides 120, 125 of the embodiment of FIG. 2A. Such a configuration, having a phonon generator 810 and a phonon detector 815 that are both electrostatic, may result in a design of particularly low complexity. Each of the phonon generator 810 and the phonon detector 815 includes a set of interdigitated electrodes connected to a pair of external terminals 825. When an AC voltage is applied across the terminals of the phonon generator 810, a constriction of the material below the interdigitated electrodes generates localized vibration or phonons, which may be transmitted onto the phononic crystal waveguide 820. In the phonon detector 815, a DC voltage is applied across the external terminals 825, and phonons incident on the phonon detector 815 cause localized vibrations that modulate the capacitance between the interdigitated electrodes of the phonon detector 815, and, as a result, generate a current at the external terminals 825.

The material below the phonon generator 810 and/or the phonon detector 815 may either be solid or slotted or etched to match the phononic crystal lattice.

Figure 9:
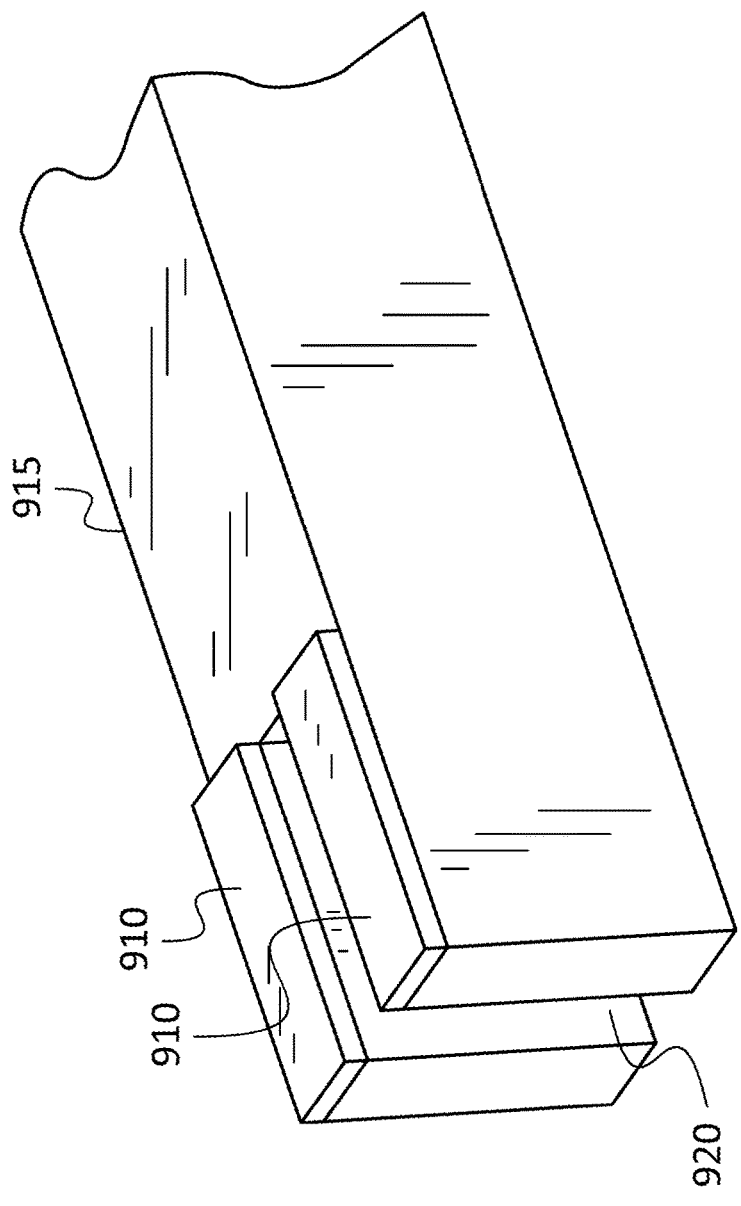
FIG. 9 is a breakaway perspective view of a phononic waveguide with an electrostatic phonon generator, according to an embodiment of the present invention.

Referring to FIG. 9, in some embodiments a phonon generator or a phonon detector may instead be formed by two electrodes 910 on one end of a phononic waveguide 915. The end of the phononic waveguide may have a gap or slot 920. As in the embodiment of FIG. 8, an electric potential applied across the electrodes may result in an attractive electrostatic force between them, resulting in a deformation of the structure. This deformation may be enhanced if the end of the phononic waveguide has a slot 920, increasing its compliance. The structure may thus act as a phonon generator. Similarly, phonons travelling on the phononic waveguide may cause the electrodes 910 to move relative to each other, so that, as in the embodiment of FIG. 8, a bias voltage applied to the electrodes, together with a change in capacitance between the electrodes, may result in a current.

Figure 10:
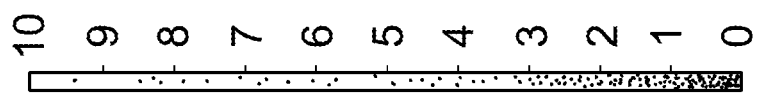
FIG. 10 is a representation of the output of a finite element model analysis of the embodiment of FIG. 9.
Figure 10:
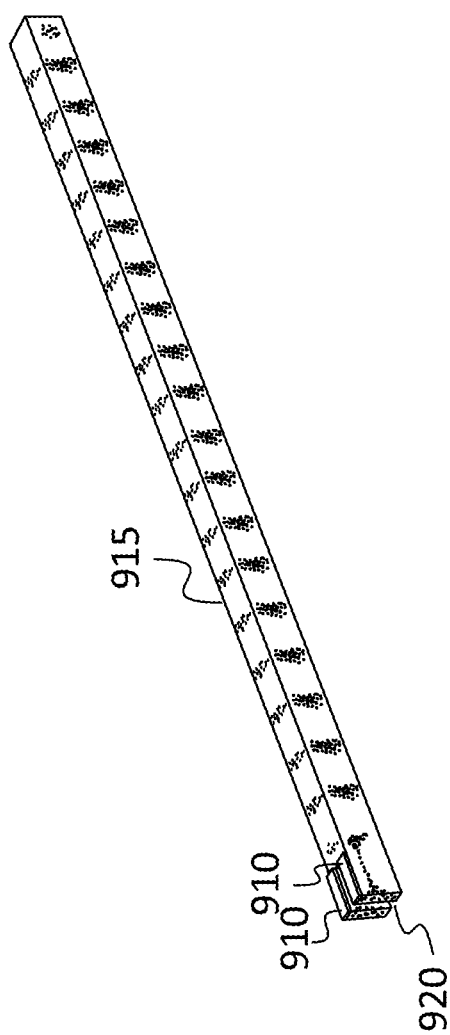

FIG. 10 shows the results of a finite element simulation of the embodiment of FIG. 9. Density of stippling represents strain, and the legend of FIG. 10 has units of parts per million. Two electrodes are placed at the end of a phononic waveguide, on either side of a slot in the phononic waveguide. The phononic waveguide has a cross section that is a square, 1.5 microns on a side. A simulated sinusoidal force is the applied at 513 MHz on both sides of the slot.

A phonon generator may be a thermal transducer, in which fluctuations in temperature (e.g., produced by an electric heater or by illumination with a modulated laser beam) cause thermal expansion and contraction that generates phonons. A phonon detector may also be a thermal transducer, in which absorbed phonons create temperature changes that are measured by a suitable temperature sensor. A phonon generator or a phonon detector may be a piezoelectric transducer, which may convert a voltage to a mechanical strain and vice versa. For some transducer designs, the performance of the transducer may depend on whether it is utilized as a phonon generator or as a phonon detector. In some embodiments, an electrical phonon generator is coupled to one end of a spiral phononic waveguide of a phononic traveling wave gyroscope, and an optical phonon detector is coupled to the other end of the spiral phononic waveguide.

In some embodiments a phononic traveling wave gyroscope may operate at a frequency of about 1 GHz, which may be about 4-5 orders of magnitude greater than the operating frequency of related art MEMS Coriolis vibratory gyroscopes (which may operate at about 10-100 kHz) and 6 orders of magnitude greater than the bandwidth of environmental vibration (which may be up to 2 kHz). Coupled with the interferometric nature of detection, this spectral separation from environmental vibration may allow a phononic traveling wave gyroscope constructed according to embodiments of the present invention to maintain bias and 1 ppm scale factor stability in the presence of vibrations with a root-mean-square (RMS) amplitude of 50 g.

Figure 11A:
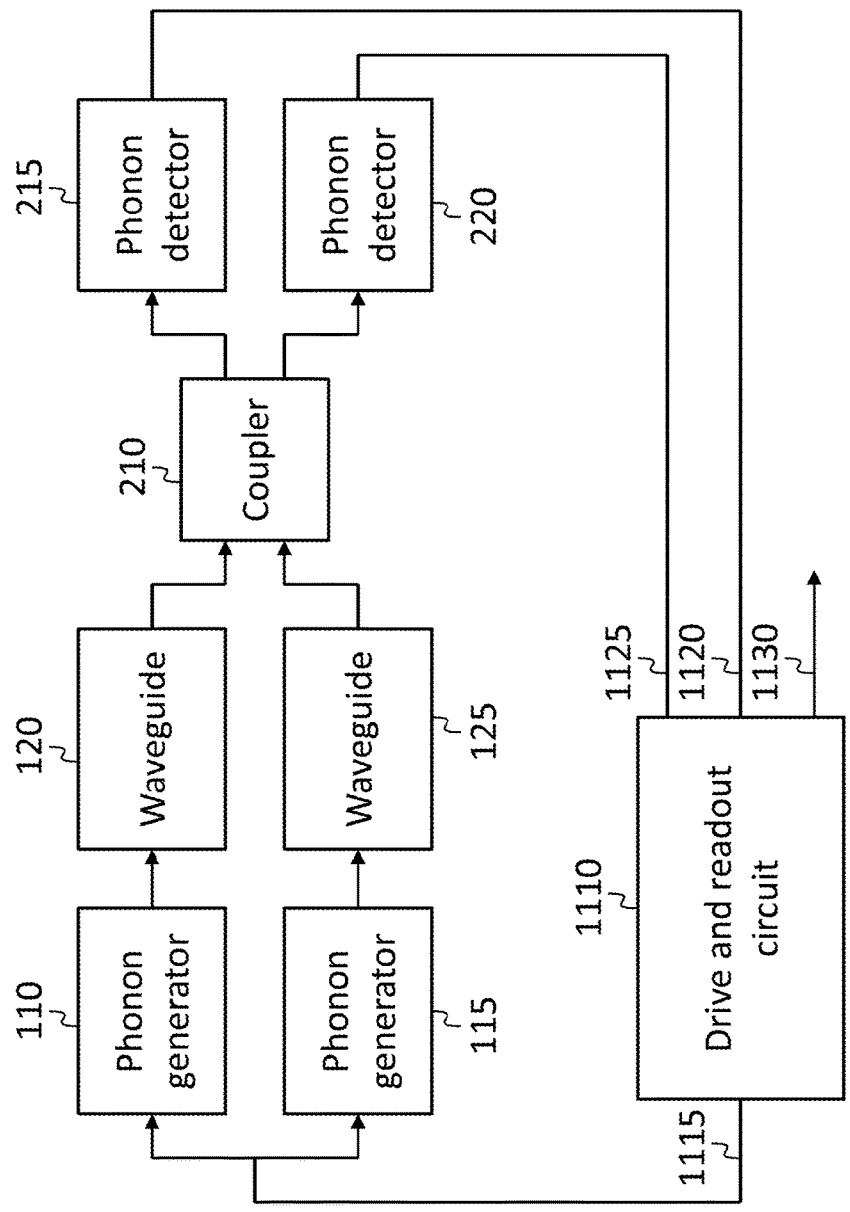
FIG. 11A is a block diagram of a phononic traveling wave gyroscope, according to an embodiment of the present invention.

Referring to FIG. 11A, in some embodiments, a drive and readout circuit 1110 in a phononic traveling wave gyroscope drives one or more phonon generators, and receives the output of one or more phonon detectors, and calculates the rotation rate of the phononic traveling wave gyroscope. In other embodiments, two or more circuits may be used to perform some or all of the functions of the drive and readout circuit 1110. In the embodiment of FIG. 11A, the phonon generators 110, 115, the phononic waveguides 120, 125, the phononic waveguide coupler 210, and the phonon detectors 215, 220, may be arranged according to the embodiment of FIG. 2A. The drive and readout circuit 1110 has a drive output 1115, configured to drive both phonon generators 110, 115 with a common signal, so that the phonons generated by the respective phonon generators 110, 115 are synchronized in phase. The phonon detectors 215, 220 may be (like, for example, the phonon detector 815 of the embodiment of FIG. 8) capable of detecting both the amplitude and phase of the received elastic waves (composed of phonons), or they may be capable only of detecting the phonon power received. The drive and readout circuit 1110 receives, at two detector inputs 1120, 1125, signals from the phonon detectors 215, 220, and estimates the state (or phase) of the fringe formed as a result of interference in the coupler. The drive and readout circuit 1110 counts whole fringes from an initial (resting) state, and adds any fraction of a fringe observed, to obtain a fringe number. The drive and readout circuit 1110 then estimates the rotation rate of the phononic traveling wave gyroscope from the fringe number, e.g., by multiplying the fringe number by $v^2/(f L D)$. The rotation rate estimate is then sent out through the phononic traveling wave gyroscope output 1130. In an embodiment that may use the same configuration of drive and readout circuit 1110, the phonon generators 110, 115, the phononic waveguides 120, 125, the phononic waveguide coupler 210, and the phonon detectors 215, 220, may be arranged according to the embodiment of FIG. 2B. In some embodiments the output signal at the phononic traveling wave gyroscope output 1130 is suitably integrated, or incorporated into a navigation state estimator, to form an estimate of the position, attitude, velocity, and/or angular velocity of a vehicle, and this estimate is then used to control the vehicle, e.g., to guide it to a target or destination.

Figure 11B:
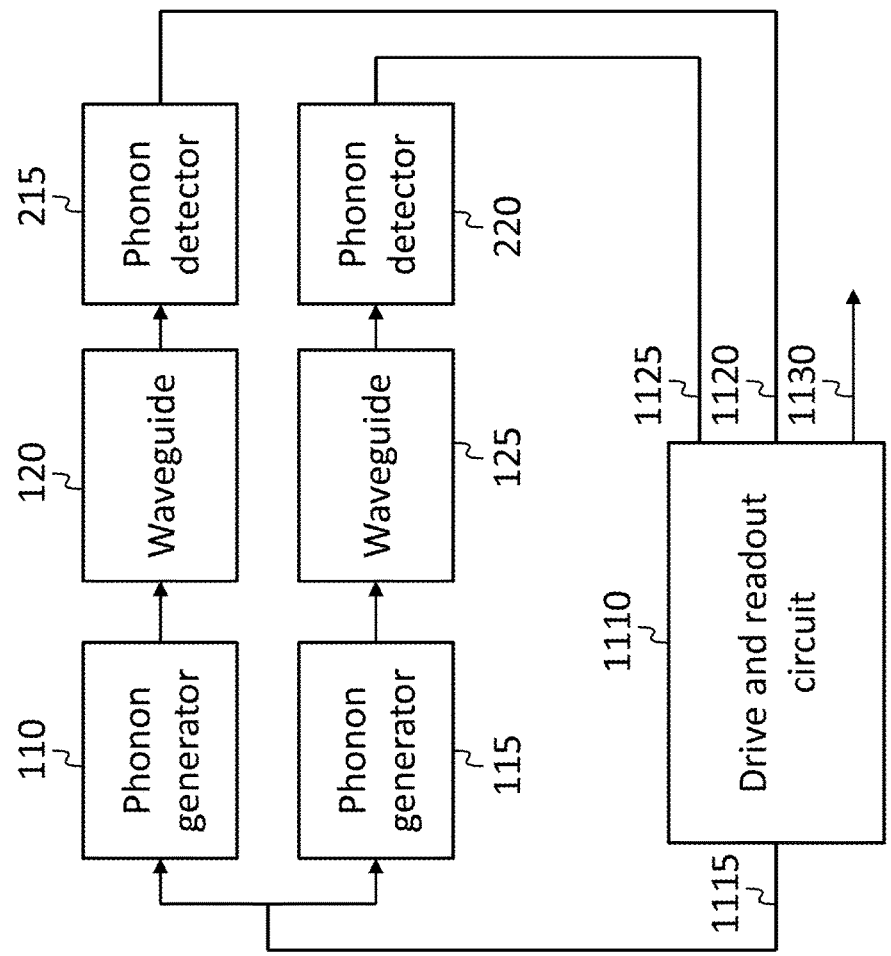
FIG. 11B is a block diagram of a phononic traveling wave gyroscope, according to an embodiment of the present invention.

Referring to FIG. 11B, in an embodiment the phonons are detected without first causing them to interfere. In this embodiment the phonon detectors 215, 220 are (like, for example, the phonon detector 815 of the embodiment of FIG. 8) capable of detecting the phase of the received elastic waves (composed of phonons). The drive and readout circuit 1110 measures the difference $\Delta\Phi$ between the respective signal phases at its two detector inputs 1120, 1125, and calculates the rotation rate as $\Delta\Phi\, v^2/(2\pi f L D)$, where $\Delta\Phi$ may have a value including multiple full rotations (multiples of $2\pi$) accumulated from the time the system was reset in an initial (resting) state or powered up. If the rotation rate at reset is not zero, then the phononic traveling wave gyroscope may measure the change in rotation rate since the most recent reset.

Figure 11C:
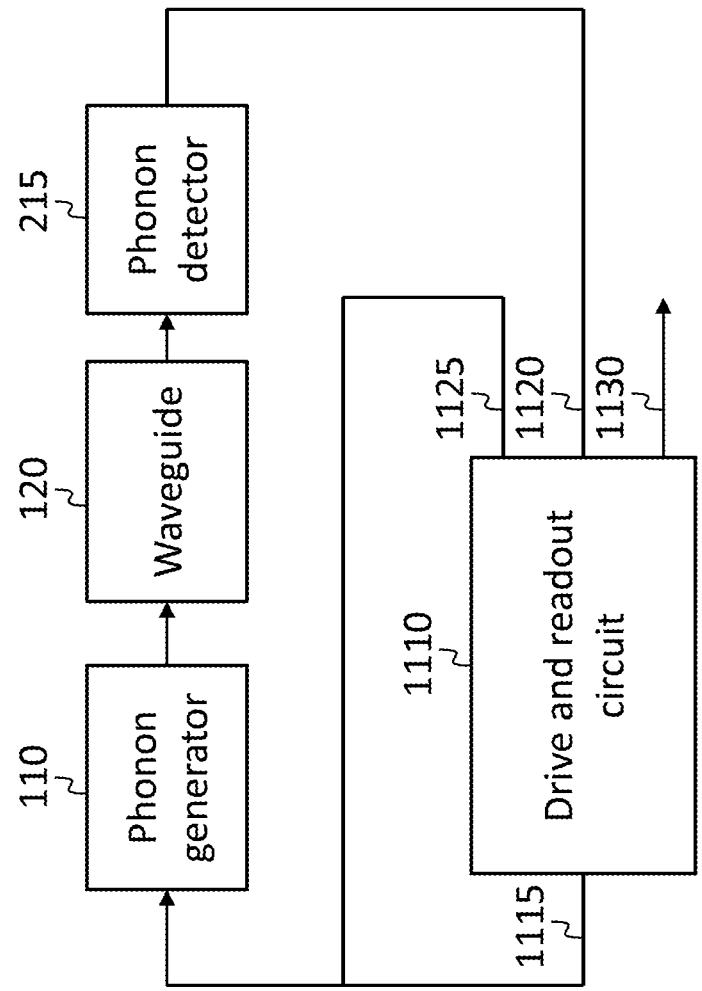
FIG. 11C is a block diagram of a phononic traveling wave gyroscope, according to an embodiment of the present invention.

Referring to FIG. 11C, in one embodiment the phononic traveling wave gyroscope includes only one phononic waveguide, and the drive and readout circuit 1110 measures the difference between (i) the phase of the drive signal applied to the phonon generator 110 (and also transmitted to the first detector input 1120), and (ii) the phase of the signal detected by the phonon detector 215.

The drive and readout circuit 1110 may include a processing unit for digital processing, and input and output circuits. The input and output circuits may include analog to digital converters and digital to analog converters, as well as radio frequency or microwave circuits, such as synthesizers, mixers, power splitters, and filters.

The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWBs. A processing unit may contain other processing units; for example a processing unit may include two processing units, an FPGA and a CPU, interconnected on a PWB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a phononic travelling wave gyroscope have been specifically described and illustrated herein, many modifications and variations will be apparent to those skilled in the art. Accordingly, it is to be understood that a phononic travelling wave gyroscope constructed according to principles of this invention may be embodied other than as specifically described herein. The invention is also defined in the following claims, and equivalents thereof.

What is claimed is:

1. A gyroscope, comprising:
   a first phononic waveguide comprising a first loop for guiding first phonons;
   a first phonon generator operatively coupled to the first phononic waveguide;
   a first phonon detector operatively coupled to the first phononic waveguide;
   a second phononic waveguide comprising a second loop for guiding second phonons;
   a second phonon generator operatively coupled to the second phononic waveguide,
   wherein a phase of the second phonons after traveling at least once around at least the second loop in a second direction opposite the first direction is a reference phase;
   a phononic waveguide coupler having:
   a first input connected to an output end of the first phononic waveguide;
   a second input connected to an output end of the second phononic waveguide; and
   a first output connected to the first phonon detector; and
   a circuit configured to estimate, from a phonon power received by the first phonon detector, a phase difference between:
   a phase of the first phonons received by the first input of the coupler, after traveling at least once around at least the first loop in the first direction, and the reference phase of the second phonons received by the second input of the coupler.

2. The gyroscope of claim 1, further comprising:
a second phonon detector operatively coupled to the second phononic waveguide,
wherein:
the phononic waveguide coupler further has a second output connected to the second phonon detector, and
the circuit is configured to estimate a phase difference between
the first phonons received by the first input of the coupler, and
the second phonons received by the second input of the coupler from:
the phonon power received by the first phonon detector and/or
a second phonon power received by the second phonon detector.

3. The gyroscope of claim 1, wherein the circuit is configured to drive the first phonon generator with a first drive signal and to drive the second phonon generator with the first drive signal.

4. The gyroscope of claim 1, wherein the first phonon generator comprises a first electrode and a second electrode,
the first electrode and the second electrode being configured to experience a mutually attractive force in response to a voltage applied across them, and
the first electrode and the second electrode being both mechanically coupled to the first phononic waveguide and configured to transmit phonons into the first phononic waveguide when an oscillating voltage is applied across them.

5. The gyroscope of claim 1, wherein the first phonon detector comprises a first electrode and a second electrode,
the first electrode and the second electrode being mechanically coupled to the first phononic waveguide and configured to form a capacitor having a capacitance that fluctuates when phonons propagate into the first phonon detector.

6. The gyroscope of claim 1, wherein the first phonon detector comprises an opto-mechanical cavity configured to act as a phonon resonator and as a photon resonator, the opto-mechanical cavity being operatively coupled to the first phononic waveguide and to a photonic waveguide.

7. The gyroscope of claim 1, wherein the first phonon generator comprises a piezoelectric element configured to transmit phonons into the first phononic waveguide.

8. The gyroscope of claim 1, wherein the first phonon detector comprises a piezoelectric element configured to receive phonons from the first phononic waveguide.

9. The gyroscope of claim 1, wherein the first phonon generator comprises a thermal actuator configured to expand when heated by an electric current or by light, and configured to transmit phonons into the first phononic waveguide.

10. The gyroscope of claim 1, wherein the first phonon detector comprises a thermal element configured to receive and absorb phonons from the first phononic waveguide and to exhibit a change in temperature in response to an absorption of phonons.

11. The gyroscope of claim 1, wherein the first phononic waveguide is a curved suspended structure, having a rectangular cross section with dimensions of less than 10 microns by 10 microns.

12. The gyroscope of claim 1, wherein the first phononic waveguide is a phononic crystal waveguide.

13. A gyroscope, comprising:
a first phononic waveguide comprising a first loop,
wherein the first phononic waveguide is a phononic crystal waveguide;
a first phonon generator operatively coupled to the first phononic waveguide;
a first phonon detector operatively coupled to the first phononic waveguide; and
a circuit configured to estimate a difference between:
a phase of phonons, after traveling at least once around at least the first loop in a first direction, and
a reference phase,
the gyroscope further comprising;
a substrate;
an anchor layer comprising a plurality of anchors; and
an acoustic layer supported by the anchors,
the acoustic layer having a first plurality of holes arranged in a periodic structure forming a phononic bandgap,
the first phononic waveguide being defined on the acoustic layer by a path lacking holes or having holes differing, in size or in spacing, from the holes of the first plurality of holes.

14. The gyroscope of claim 13, further comprising:
a second phononic waveguide comprising a second loop;
a second phonon generator operatively coupled to the second phononic waveguide; and
wherein the reference phase is a phase of phonons after traveling at least once around at least the second loop in a second direction opposite the first direction.

15. The gyroscope of claim 13, further comprising:
a second phonon generator;
a second phonon detector;
a first phononic waveguide coupler having:
a common port connected to a first end of the first phononic waveguide;
an input port connected to the first phonon generator and coupled to the common port; and
an output port connected to the first phonon detector, the output port being coupled to the common port and isolated from the input port; and
a second phononic waveguide coupler having:
a common port connected to a second end of the first phononic waveguide;
an input port connected to the second phonon generator and coupled to the common port; and
an output port connected to the second phonon detector, the output port being coupled to the common port and isolated from the input port, wherein the circuit is configured:
to drive the first phonon generator with a first drive signal and to drive the second phonon generator with the first drive signal; and
to estimate a difference between:
a phase of phonons detected by the first phonon detector, and
a phase of phonons detected by the second phonon detector.

16. The gyroscope of claim 13, wherein the first phonon generator comprises a first electrode and a second electrode,
the first electrode and the second electrode being configured to experience a mutually attractive force in response to a voltage applied across them, and
the first electrode and the second electrode being both mechanically coupled to the first phononic waveguide and configured to transmit phonons into the first phononic waveguide when oscillating voltage is applied across them.

17. The gyroscope of claim 13, wherein the first phonon detector comprises a first electrode and a second electrode, the first electrode and the second electrode being mechanically coupled to the first phononic waveguide and configured to form a capacitor having a capacitance that fluctuates when phonons propagate into the first phonon detector.

18. The gyroscope of claim 13, wherein the first phonon detector comprises an opto-mechanical cavity configured to act as a phonon resonator and as a photon resonator, the opto-mechanical cavity being operatively coupled to the first phononic waveguide and to a photonic waveguide.

19. The gyroscope of claim 13, wherein the first phonon generator comprises a piezoelectric element configured to transmit phonons into the first phononic waveguide.

20. The gyroscope of claim 13, wherein the first phonon detector comprises a piezoelectric element configured to receive phonons from the first phononic waveguide.

21. The gyroscope of claim 13, wherein the first phonon generator comprises a thermal actuator configured to expand when heated by an electric current or by light, and configured to transmit phonons into the first phononic waveguide.

22. The gyroscope of claim 13, wherein the first phonon detector comprises a thermal element configured to receive and absorb phonons from the first phononic waveguide and to exhibit a change in temperature in response to an absorption of phonons.

23. The gyroscope of claim 13, wherein the first phononic waveguide is a curved suspended structure, having a rectangular cross section with dimensions of less than 10 microns by 10 microns.

24. The gyroscope of claim 13, wherein the first phononic waveguide is a phononic crystal waveguide.

* * * * *